Patented Feb. 23, 1932

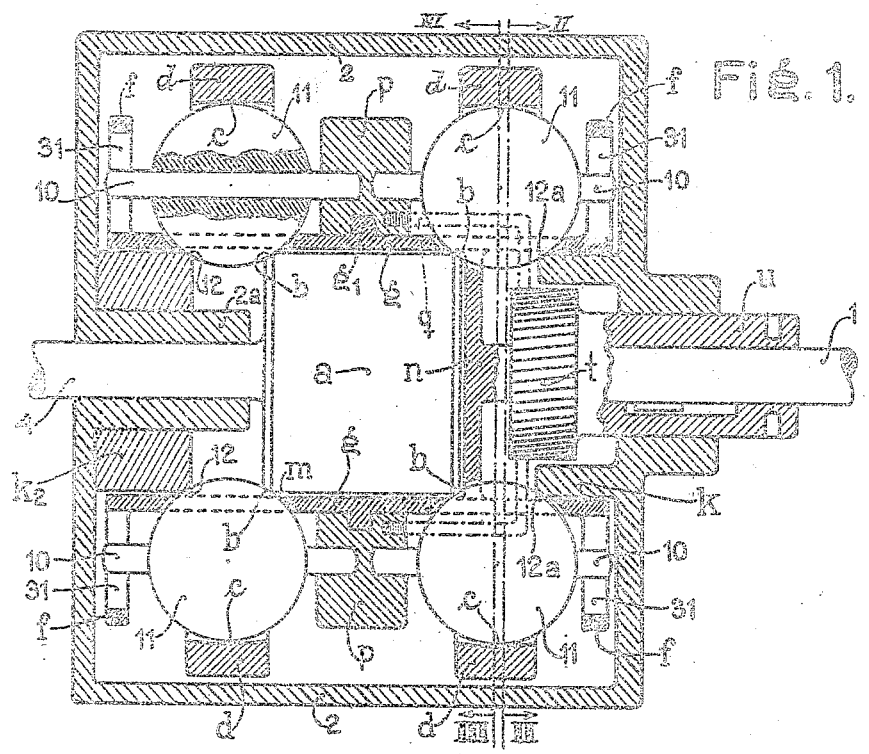

1,847,027

UNITED STATES PATENT OFFICE

THOMAS PETER THOMSEN AND ANTON VALDEMAR THOMSEN, OF KASTRUP, DENMARK

CHANGE-SPEED GEAR

Application filed February 7, 1931, Serial No. 514,263 and in Denmark February 19, 1930.

It is known to transmit rotation from one of two coaxially mounted shafts (main shafts) to the other by means of ball rims the balls of which may roll on surfaces or races partly stationary, partly forming parts of plates on the two main shafts, and it is also known to vary the rotary speed of the two main shafts or to reverse the rotation by making the balls of the said ball rims rotatable on shafts, the positions of which may be varied.

The present invention relates to a change speed gear of the said type and consists essentially in this that the shafts on which the balls are rotatable are mounted in two plates one on each side of the ball rims, the rotary speed of the two main shafts being varied by rotating the two plates with relation to one another. One of the plates is rigidly connected to the driving main shaft the rotation and adjustment of the plates with relation to one another being thereby more accurately secured.

The invention is shown in the accompanying drawings representing two forms of execution of the said change speed gear which is provided with two ball rims arranged in parallel planes perpendicular to the axis of the gear.

Fig. 1 is an axial section of one form of a change speed gear according to the invention.

Figure 3:
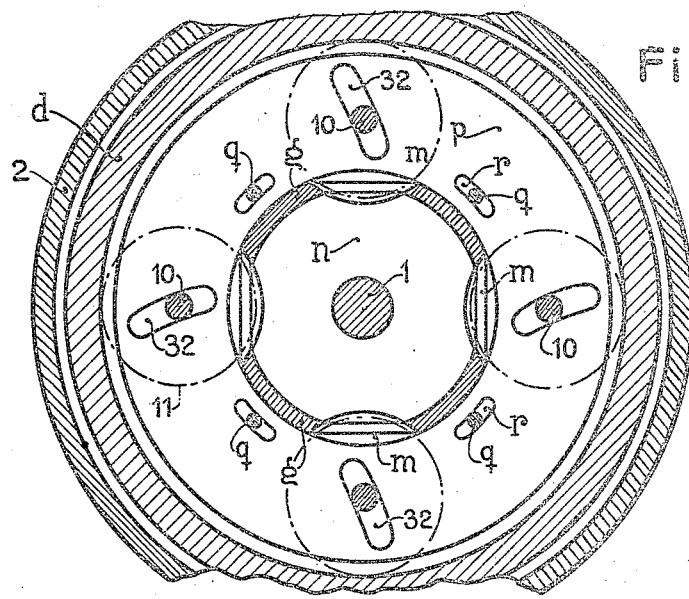
Figure 4:
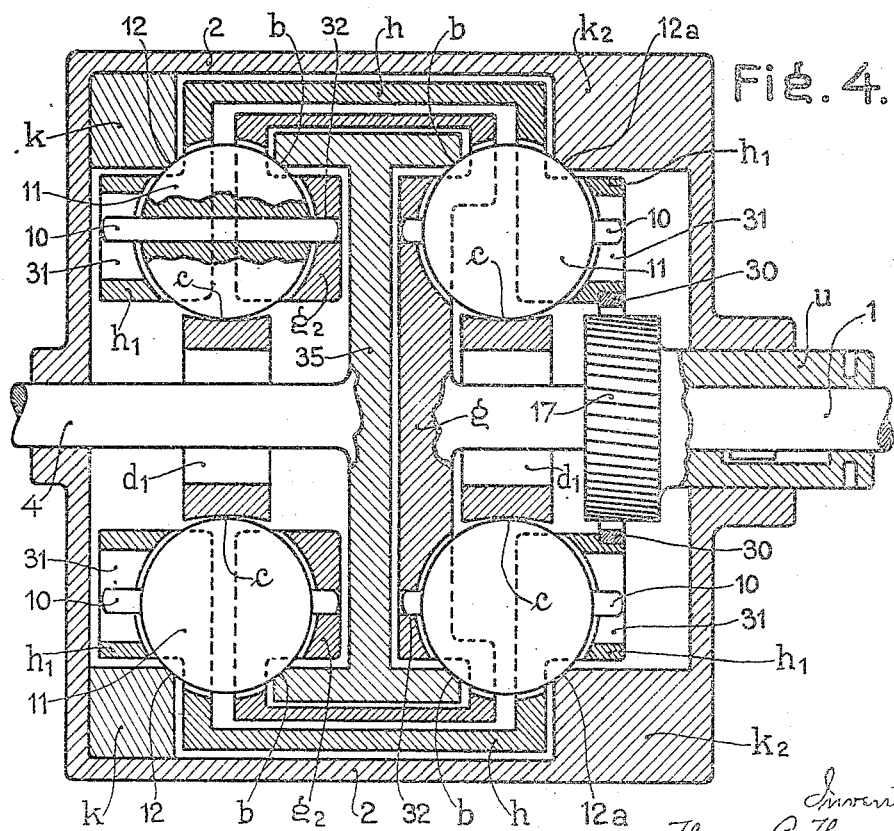

Figs. 2 and 3 two sections on the lines II—II and III—III respectively, seen in the direction of the arrows and with the balls withdrawn and Fig. 4 an axial section of a modification.

In the form shown in Figs. 1–3 the driving shaft 1 and the driven shaft 4 are mounted in a casing 2. The driven shaft 4 has a cylindrical head $a$ having provided on its circular edges races $b$ for the balls 11. 12 and 12$a$ are the stationary races for the balls 11 the third support of which is formed by the inner faces $c$ of two rings $d$ each encircling one of the two ball rims.

The ball shafts 10 are mounted with one end in radial slots 31 in flanges $f$ on the ends of a tubular body $g$ idly rotating with relation to the head $a$, to a ring $k_2$ provided with the race 12, and to an annular flange $k$ secured to the casing 2 and provided with the ball race 12$a$. The tubular body $g$ has openings $m$ for the balls 11 and a partition $n$ for rigidly connecting the body $g$ to the shaft 1.

The other end of each of the shafts 10 is mounted in a recess 32 of a ring $p$ rotatable on the body $g$ and guided by a cam $g_1$ provided on the body $g$ and engaging a groove in the ring. When the ring $p$ is rotated with relation to the body $g$ the shafts 10 lying normally in parallel planes will be turned out of these planes.

As stated above the body $g$ is rigidly connected to the driving shaft 1 and when the said turning out of the shafts 10 is going to take place the ring $p$ must be rotated with relation to the body $g$. To this effect the ring $p$ is provided with arms $q$ which for clearness sake are shown in the drawings in the form of thin angular rods led through slots $r$ in the body $g$ and carrying shoes $s$ sliding in inclined grooves $t$ in the circumference of a plate having an elongated hub $u$ reciprocating on the shaft 1 but being keyed on the shaft 1 so as to follow its rotation. When the hub $u$ is displaced on the shaft 1 the shoes $s$ will be laterally displaced sliding in the inclined grooves $t$ and the arms $q$ secured to the shoes will turn the ring $p$ the shafts 10 being thereby turned out of the axial plane through the centres of the balls 11. Thereupon the shafts 10 will quickly return to the said axial planes in a manner known per se but they will now take up another angular position with relation to the axis than before the displacement of the hub.

The ring $k_2$ with the race 12 is mounted on the hub 2$a$ of the driven shaft 4 inside the casing 2 and may be displaced on the said hub. By displacing the ring $k_2$ to the right (in Fig. 1) the pressure of the balls on the race $b$ and thereby on the driven shaft may be increased.

The circular races $b$, 12 and 12$a$ are spaced uniformly apart from the axis of the change speed gear. The two ball rims are symmetrically mounted with relation to a transverse plane through the gear and as the head $a$ carries the two races $b$ for the balls the opposing axial side pressures produced by the ball rims will equalize one another. The outwardly directed axial side pressures are taken up by the stationary races 12 and 12a, and by using two or another suitable even number of ball rims mounted as described it will be possible to avoid the use of ball bearings for taking up the side pressures as will also appear from the drawings.

During rotation the centrifugal power will force the balls 11 outwardly their pressure against the ring $d$ thereby increasing considerably and in a direct ratio to the square of the speed of rotation. This pressure will, however, be totally absorbed by the idly rotating rings $d$ lying in planes perpendicular to the axis of the change speed gear, and therefore the pressure will not bring about any difficulties.

Rotation of the shaft 1 is transmitted through the body $n$, $g$, $f$, the shafts 10, the balls 11 and the head $a$ to the shaft 4, and by suitable adjustment of the hub $u$ on the shaft 1 the desired gear ratio of the two shafts as to speed and direction of rotation may be obtained in a manner known per se.

With the form shown in Fig. 4 the driven shaft 4 carries a head 35 of T-shaped cross-section and provided with the races $b$. The body $g$ is rigidly connected to the driving shaft 1 and rotatably encircling the flange of the head 35. In this case the body $g$ is in the form of a plate and provided with an annular flange $g_2$ projecting round the flange of the head 35 and engaging under the same. The plate-shaped portion of the body $g$ is provided with recesses 32 for one end of the shafts 10 appertaining to the right ball rim, whereas the corresponding recesses 32 for the left ball rim are provided in the flange $g_2$.

Encircling the body $g$, $g_2$ is a hollow cylindrical body $h$ with inwardly projecting flanges $h_1$ provided with the radial slots 31.

The circular races $b$ and 12, 12a are provided at the side of the balls 11 opposite to the axis of the gear but at a uniform distance therefrom, and at the side facing the axis the balls bear against idly rotating rings $d_1$ having each a concave outer surface.

The balls 11 of the two ball rims will by action of the centrifugal power be pressed against the races 12, 12a and $b$ increasing the said pressure which is a useful pressure. With this form it is not necessary to tighten up the ring so hard on the left ball rim as with the embodiment shown in Fig. 1 for obtaining the same degree of power transmission.

In this case the two races $b$ are also provided on the same body 35 and the axial side pressures produced by the balls 11 will therefore be as easily eliminated as with the form shown in Fig. 1. The shafts 1 and 4 are led freely through the ring $d_1$.

Rotation of the body $h$, $h_1$ with relation to the body $g$, $g_2$ takes place in a similar manner as with the first mentioned embodiment. Mounted on the shaft 1 is a displaceable hub $u$ carrying a circular plate with inclined grooves 17 engaging with inwardly projecting teeth 30 on one of the flanges $h_1$. When the hub $u$ is displaced the body $h$, $h_1$ will be rotated with relation to the body $g$, $g_2$ the shafts 10 being thereby turned out of the axial plane pivoting on the centres of the balls.

Rotation of the driving shaft 1 is transmitted through the body $g$, $g_2$, the shafts 10, the balls 11 and the body 35 to the driven shaft 4.

In order to assemble the casing 2 and the various members mounted therein with flanges the said members are assembled by suitably rigidly interconnected parts.

We claim:

1. A change speed gear comprising a driving shaft (1), and a co-axially disposed driven shaft (4), means providing a pair of axially spaced stationary ball race surfaces (12 and 12$^a$) symmetrically disposed with respect to the axes of said shafts, means fixedly connected with one of said shafts providing a pair of ball race surfaces ($b$, $b$) adapted to cooperate with the fixed ball race surfaces, a pair of rings ($d$, $d$ or $d_1$, $d_1$) providing a pair of ball race surfaces ($c$, $c$), all of the said ball race surfaces forming a pair of axially spaced ball races, a pair of diametrically opposed balls (11) in each ball race, shafts (10) upon which said balls are mounted, and about the axes of which the balls are rotatable, means driven by said driving shaft to revolve the balls about the axis of the driving and driven shaft, means adjacent each ball race to engage shafts (10) to determine the angular relation thereof to the axis of the driving and driven shafts and means to vary said angular relation.

2. A change speed gear, according to claim 1 in which the means adjacent the ball race to engage the ends of shafts (10) comprises plates ($f$ and $p$, or $g$, $g_1$ and $h_1$) one of said plates being rigidly connected with the driving shaft.

3. A change speed gear, according to claim 1 in which the means adjacent the ball race to engage the ends of shafts (10) comprises plates ($f$ and $p$, or $g$, $g_1$ and $h_1$) one of said plates being rigidly connected with the driving shaft and in which two of the ball race surfaces (12 and $b$ or 12$_a$ and $b$) of each ball race are equally spaced from the axis of the driving and driven shaft but the third surface ($c$) of each ball race is radially spaced from the other surfaces thereof.

4. A change speed gear, according to claim 1 in which the means adjacent the ball race to engage the ends of shafts (10) comprises plates ($f$ and $p$, or $g$, $g_1$ and $h_1$) one of said plates being rigidly connected with the driving shaft and in which two of the ball race surfaces (12 and $b$ or $12_a$ and $b$) of each ball race are equally spaced from the axis of the driving and driven shaft but the third surface (c) of each ball race is radially spaced from the other surfaces thereof and in which the ball races are provided with a number of pairs of oppositely and symmetrically disposed balls, the means providing a pair of ball race surfaces ($b, b$) are provided in pairs and formed on the same body, a casing, the ball race surfaces (12, 12a) being stationary in the casing, whereby axial side pressure of the balls is eliminated.

In testimony whereof we affix our signatures.

THOMAS PETER THOMSEN.
ANTON VALDEMAR THOMSEN.